July 16, 1963   M. A. EGGENBERGER ETAL   3,098,176
ELECTRIC LONG RANGE SPEED GOVERNOR
Filed Jan. 3, 1961   4 Sheets-Sheet 1
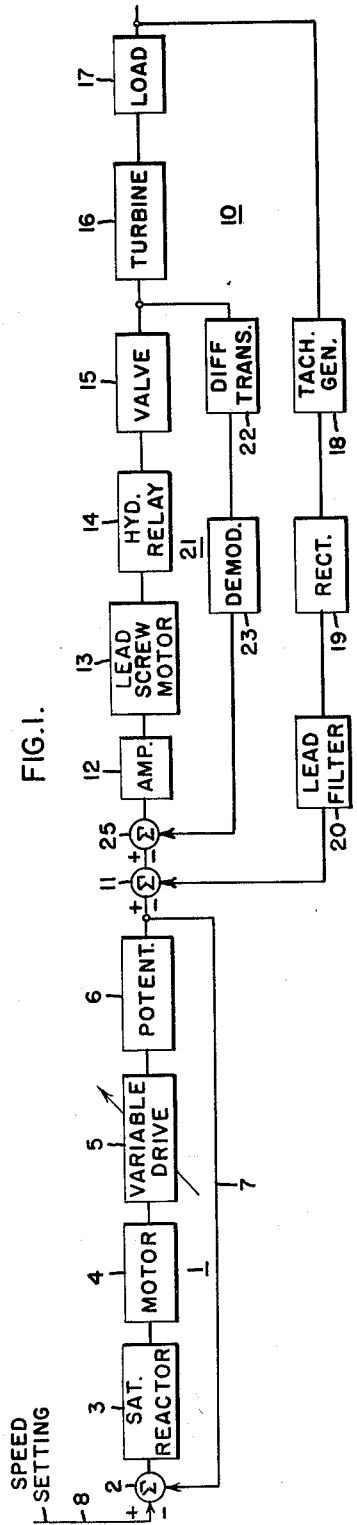
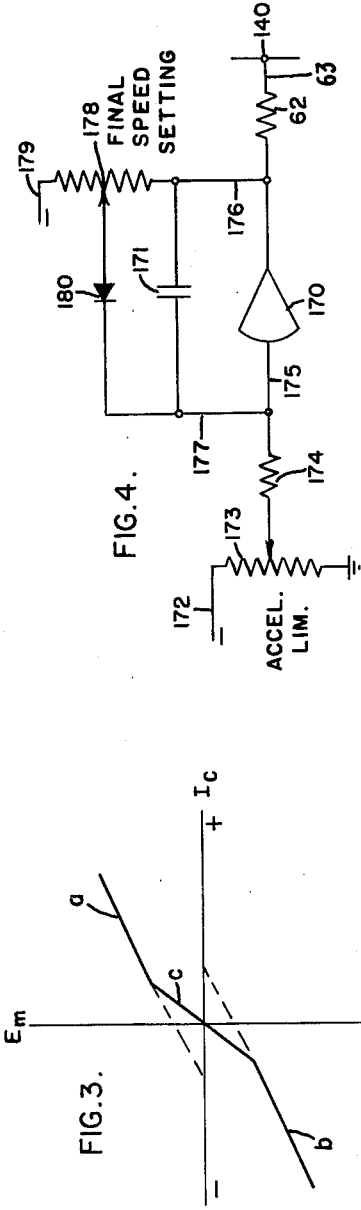
INVENTORS:
MARKUS A EGGENBERGER,
PAUL H. TROUTMAN,
JOSEF J. SAUTER
BY *W. C. Crutchy*
THEIR ATTORNEY.

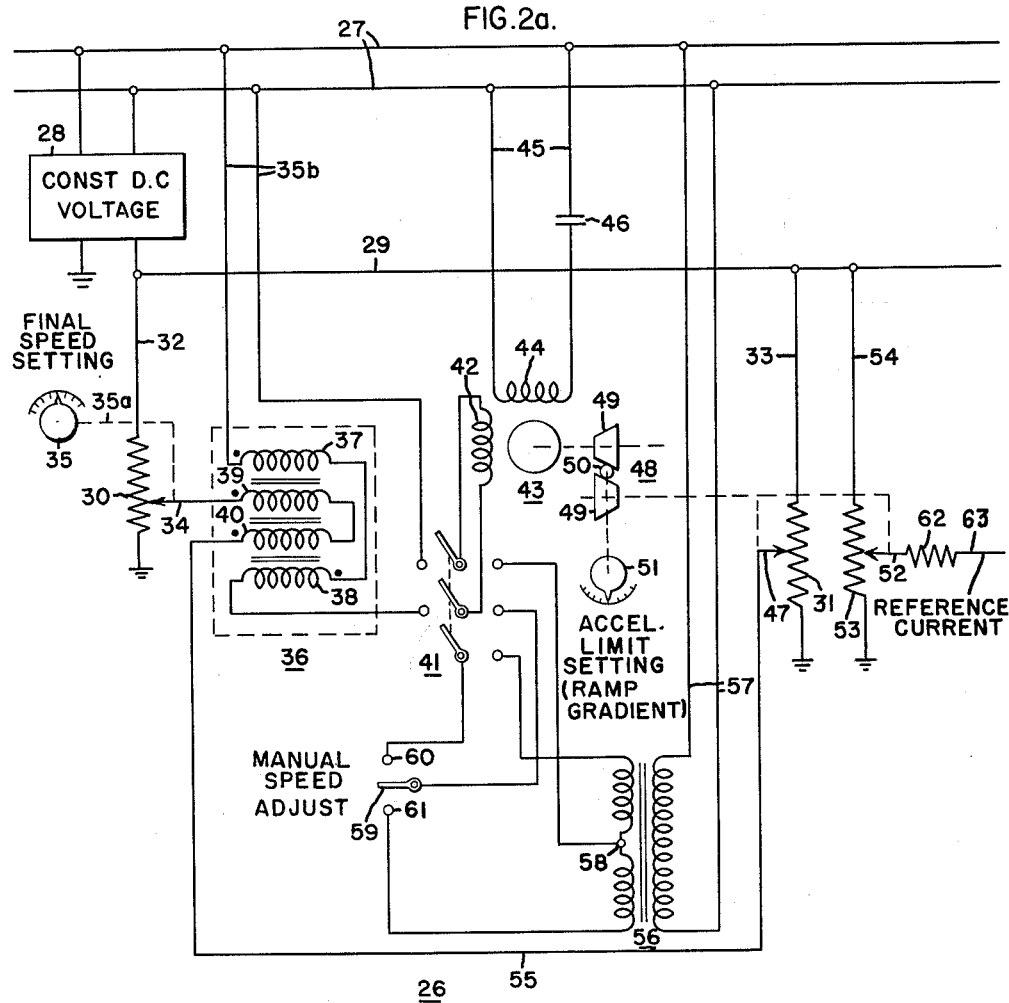

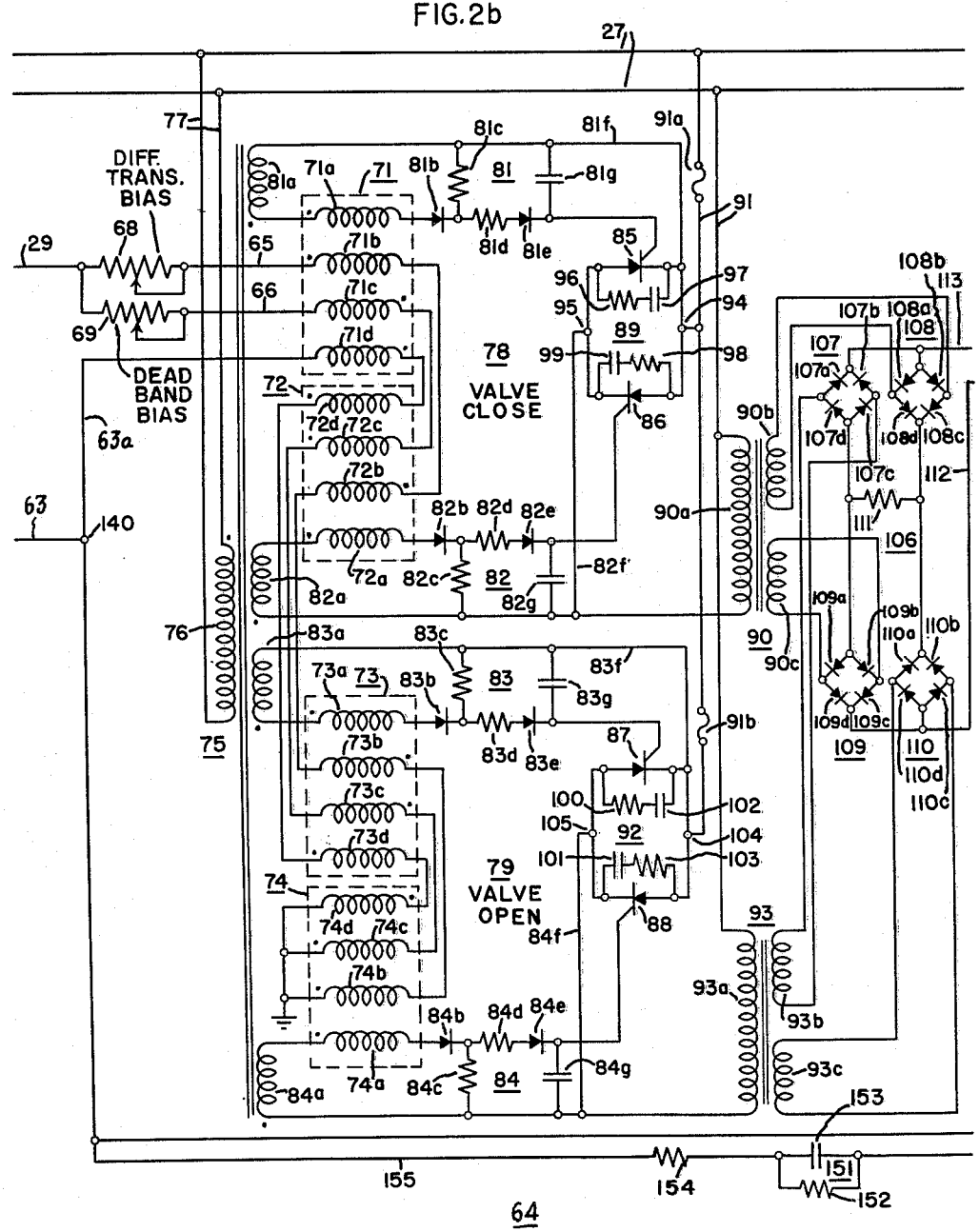

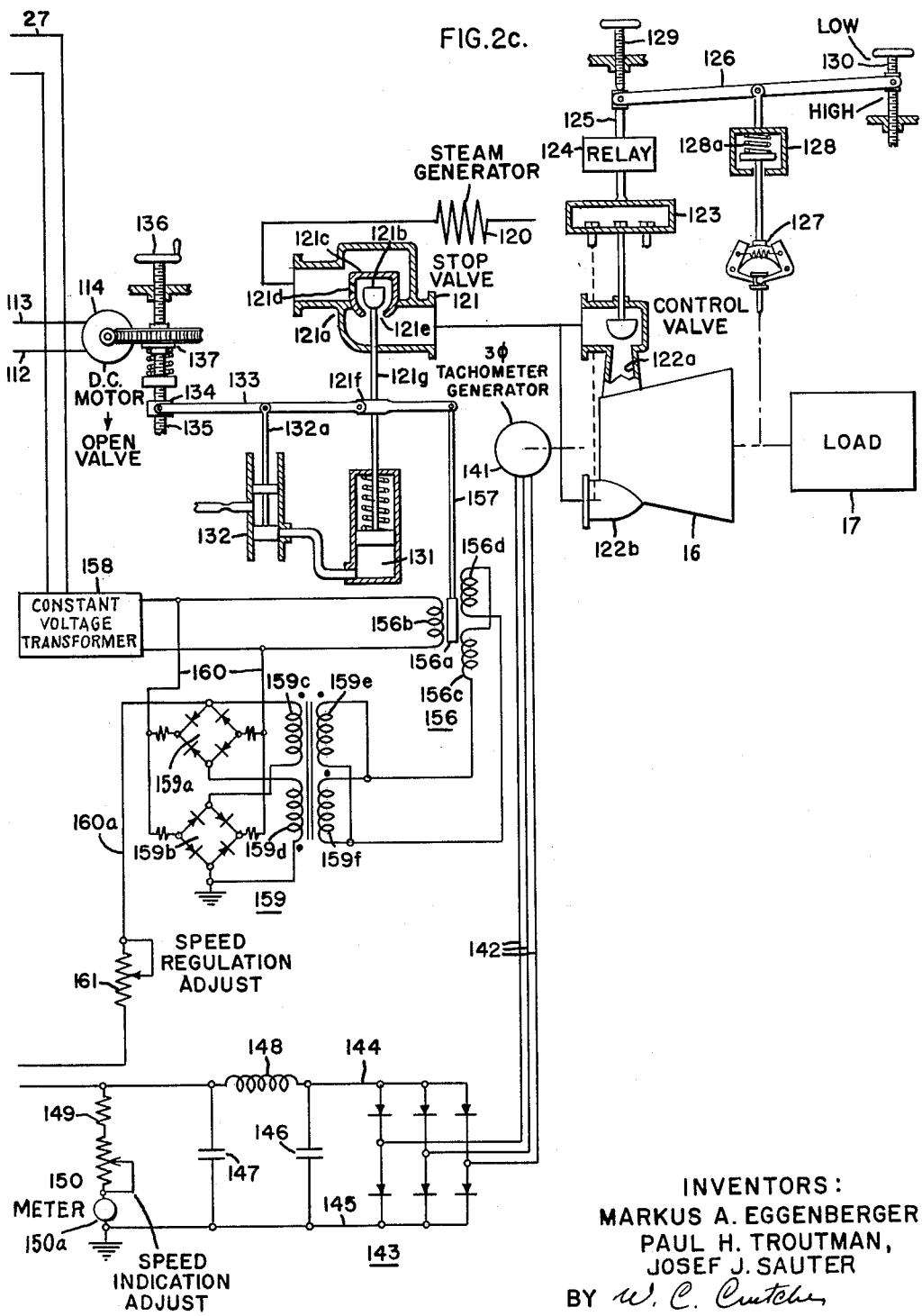

United States Patent Office 3,098,176
Patented July 16, 1963

3,098,176
ELECTRIC LONG RANGE SPEED GOVERNOR
Markus A. Eggenberger, Paul H. Troutman, and Josef J. Sauter, Schenectady, N.Y., assignors to General Electric Company, a corporation of New York
Filed Jan. 3, 1961, Ser. No. 80,290
20 Claims. (Cl. 317—5)

This invention relates to an electric control system for a prime mover and more particularly it relates to an electric long range speed governor for controlled acceleration of the prime mover from standstill to rated speed with improved stability during change in speed and also for holding the prime mover speed within close limits with a preset regulation while load is applied.

A governor for a prime mover is generally designed with a given rated speed in mind, and hence it gives its best performance at speeds near the rated speed. The "regulation" or "droop" of a governor for a prime mover such as a steam turbine controlled by a valve is the change in speed at a constant speed setting on the governor as the prime mover goes from a no-load to a full-load condition and this may be related to the percent speed change required to move the valve full travel. The value of the regulation is a measure of how accurately around the rated speed a unit will hold speed, or in case the prime mover is driving a generator connected into a large electrical system and hence sharing a load with other generators, the regulation is a measure of how rapidly the prime mover will pick up or shed load with a given change in system frequency.

It may be desirable, for many reasons, to bring a prime mover gradually up to speed or to decelerate it gradually while keeping the speed within close limits of a desired acceleration or deceleration curve. For example, in a high temperature, high pressure steam turbine, the steam is preferably admitted gradually in accordance with a scheduled startup time in order to prewarm the turbine so as to reduce the imposition of unnecessary thermal stresses. Thus the turbine is gradually brought up to speed according to a predetermined time schedule. As an adjunct to admitting the steam slowly, it is also desirable to admit the steam to all of the steam nozzles spaced around the circumference of the turbine casing at once so as to accomplish "full arc admission," and thereby uniformly heat the circumferentially spaced nozzles to avoid severe thermal gradients. This latter concept and an arrangement for accomplishing "full arc admission" during startup is disclosed in U.S. Patent 3,027,137, issued in the name of Markus A. Eggenberger on March 27, 1962, and assigned to the assignee of the present application. In that patent, the turbine was operated at rated speed under partial load with a separate auxiliary governing system, which actuated a bypass valve admitting steam through the "stop" valve while all of the "control" valves were open, thus giving "full arc admission." There, however, the turbine was brought from standstill gradually up to rated speed by operating the valves manually by means of a "load limit."

In any control system there are inherent time lags between the time when the input signal is applied and the time when the system responds. These are due to the time lags associated with the time constants of the various components. Various non-linearities may also exist. For example, a "dead band" in the hydraulic pilot valves allows a slight movement of the valve without any result taking place. Electric servo motors require an initial voltage to overcome the friction in the bearings. Good sensitivity of the system during "steady state" governing combined with damping to prevent oscillations or "hunting" during speed changes must be combined in the proper manner to give satisfactory results.

Accordingly, one object of the present invention is to provide an improved electric control system for governing the speed of a prime mover.

Another object is to provide an electric long-range speed governor which can maintain the speed of a prime mover within close limits at any desired speed between standstill and approximately rated speed.

Another object of the invention is to control the rate of acceleration from an initial speed setting to a desired final speed setting.

Another object of the invention is to provide a long range speed governor wherein the final speed setting may be read into the governor at the initiation of operation, and the governor thereafter takes over and brings the prime mover up to the final speed at a preset rate.

Another object is to provide an improved arrangement for moving a prime mover from an initial speed setting to a desired speed setting with a reduced tendency for overshooting the final speed setting.

Another object of the invention is to provide an electric control system for controlling the hydraulic valve-actuating means during steady-state governing.

Another object is to provide an improved arrangement for providing a stabilizing feedback signal derived from valve position measurement.

Another object is to provide substantially the same "regulation" as in a mechanical governor, but over a wide range of speeds.

Another object is to provide means for introducing an adjustable "regulation" for a prime mover operating in parallel with other prime movers.

Another object is to provide means for remotely adjusting the speed of the prime mover driving a generator while it is under the control of the electric governor, which is adaptable to either manual or automatic operation, for the purpose of synchronizing the speed of the generator for parallel operation.

Another object of the invention is to provide an electric long range speed control system for a prime mover which, because of controlled acceleration rate, reduced tendency to decelerate momentarily or to overshoot, provision for rapid response of the valve actuator during steady state governing, and both speed and valve position feedback, is suitable for automatic startup operations so as to minimize thermal stress on the turbine parts.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a block diagram of the system;

FIGS. 2a–2c comprise a schematic diagram, in simplified form, of the components of our improved electric governing system as applied to a turbine with a "controlled stop valve," i.e. a valve serving both as a throttling valve and as a shut-off valve, for "full arc" startup of a steam turbine powerplant;

FIG. 3 is a graph of the transfer characteristic of the amplifier employed in the system; and FIG. 4 is a schematic diagram of a modification of the portion of the system shown in FIG. 2a, the rest of the system being omitted for purpose of clarity.

Generally stated, the invention involves controlling the speed (or load) of a prime mover by means of an amplified error signal which actuates a servo motor to position a valve. The amplifier is two-stage in the embodiment shown, using the load windings of a group of magnetic amplifiers in the first stage to actuate the gating electrodes of silicon controlled rectifiers in the second stage for varying time intervals. The amplifier output is a full wave rectified amplified signal having a transfer characteristic providing higher gain for more rapid speed of response near the operating null when steady state governing is employed. The error signal fed to the amplifier is obtained from a comparison of three signals, a reference signal, a speed feedback signal, and a valve position feedback signal. The input reference signal is varied at a preset rate toward a final predetermined speed setting. This reference signal, representing desired speed is constantly compared with a speed feedback signal represented by actual speed as derived from a tachometer generator to give a speed error signal. A valve position feedback signal is also used to modify the speed error signal so as to provide "regulation" or "droop." Thus the turbine speed is controlled during acceleration, according to a desired acceleration schedule, to a final desired speed. The load may also be controlled after the desired speed is attained by adjusting the reference input, regulation under load being influenced by the valve position feedback.

*Block Diagram*

Referring now to the block diagram of FIG. 1 in the drawing, which represents the difference between voltage on line 8 and that on feedback conductor 7, a first loop 1 comprises a summing device 2 feeding a D.C. control current to a saturable reactor 3, the output of which drives a motor 4 according to the direction of the current. The motor shaft operates through a variable drive 5 to move the slider arm on a potentiometer 6 which returns a feedback current to summing device 2 by way of the feedback path indicated at 7. The input to loop 1 is a voltage applied to conductor 8 representing a desired final speed setting entering summing device 2 as shown at 8, and the output from loop 1 is a "reference voltage" which changes with respect to time at a rate determined by the setting on variable drive 5. Thus loop 1 converts the desired final speed setting into a varying reference voltage that will serve to drive the prime mover from its initial speed to the final speed setting over a preset time interval.

The reference voltage from loop 1 is fed to another loop designated generally as 10 and comprised as follows: A summing device 11 provides an input for an amplifier 12 which drives a lead screw motor 13 in either direction depending upon the sense of the signal from amplifier 12. The lead screw motor operates a hydraulic relay 14 which positions a valve 15. The valve 15 controls the flow of steam to a turbine 16 driving a load 17 thereby producing operation of the turbine at a corresponding speed. The turbine speed is sensed by a tachometer generator 18 whose output is rectified by a rectifier 19 and fed back through a lead filter 20 to summing device 11.

A valve position feedback is provided by a sub-loop, shown generally as 21, which senses valve position by means of a differential transformer 22. The A.C. signal from the differential transformer is demodulated at 23, and fed back to a summing device 25.

The operation of the block diagram shown in FIG. 1 will now be briefly described. At the start, turbine 16 is at a standstill and load 17 may be considered as consisting of only an inertia load and frictional losses. A desired final turbine speed, which will usually be the turbine rated speed, is preset in line 8 although an intermediate final speed could also be set on line 8. The rate of acceleration to this final speed is set by adjusting variable drive 5. This affects the time it will take motor 4 to move potentiometer 6 to the final speed setting. Summing device 2 supplies an error signal, which represents the difference between voltage on line 8 and that on feedback conductor 7, which is amplified by saturable reactor 3 to operate motor 4 which, in turn, drives potentiometer 6. The movement of the slider arm on potentiometer 6 is such as to cause it to move to a position where the signal furnished over feedback line 7 will balance or null the speed setting signal furnished over line 8 and a zero error signal from summing device 2 will then cause the motor 4 to stop. The reference signal furnished to the summing device 11, therefore, is gradually increasing with time at a constant rate, the rate being determined by the setting of variable drive 5. This is known as a "ramp" input function, the gradient of the ramp varying according to the setting of variable drive 5.

The increasing "ramp" reference signal then passes through and is modified by feedback signals applied to summing devices 11, 25 and is amplified in amplifier 12. Amplifier 12 may have a special transfer characteristic as will be outlined in detail later on. The amplified signal operates a motor 13 driving a lead screw, which actuates a hydraulic relay pilot valve 14, which in turn actuates the main turbine valve. An increasing reference signal will cause valve 15 to open admitting steam to turbine 16.

Since the increasing reference signal furnished by loop 1 represents a desired turbine speed, the actual turbine speed is continually compared with the desired signal by a feedback loop comprising tachometer generator 18, rectifier 19, and lead filter 20. The lead filter 20 serves to furnish a leading or derivative characteristic to the feedback signal which counteracts the lagging characteristic due to the time constants of the elements 12–17.

To further offset the time lag between the time that valve 15 moves and turbine 16 changes speed, and to provide "droop," the sub-loop 21 converts the valve movement immediately to a feedback signal which is furnished through differential transformer 22 and demodulator 23, to the summing device 25, thus further modifying the speed of response.

*Acceleration Control Circuit*

The function of loop 1 in the block diagram may be illustrated more clearly by a more detailed description of the system in which one type of acceleration control circuit is described.

Referring now to FIG. 2a of the drawings, an acceleration control circuit is shown generally at 26 and is supplied by a bus line 27 connected to a source of 115 volt 60 cycle alternating current. Serving as a source for the D.C. signal voltages is a regulated D.C. voltage power supply 28 of a type suitable to provide a ripple-free D.C. voltage which remains at a constant value. A suitable type for this application would be any highly regulated D.C. voltage power supply similar to that shown in FIGURE 19.6 on page 203 of General Electric Transistor Manual, fifth edition, General Electric Company, 1960. The positive lead 29 from D.C. voltage supply 28 is connected to one end of a speed setting potentiometer 30 and also connected to one end of a feedback potentiometer 31 by means of leads 32, 33 respectively. The opposite terminals of these potentiometers are connected to ground. A slider arm 34 on potentiometer 30 is manually set by means of a speed setting control knob 35, the mechanical linkage being indicated by the dotted line 35a.

Also connected to the A.C. voltage source 27 by leads 35b is a series-connected saturable reactor shown generally as 36 having load windings 37, 38 connected in series-aiding and control windings 39, 40 connected in series-opposition. A double-throw switch 41 serves, in its left-hand position, to connect the load windings 37, 38 of saturable reactor 36 to the control field winding 42 of a two-phase A.C. servo motor shown generally at 43 and corresponding to the motor 4 in FIG. 1. A fixed field winding 44 is connected to A.C. voltage source 27 by means of leads 45 in series with a capacitor 46 in order to place the fixed field 44 in quadrature with the control field winding 42.

The shaft of the servo motor 43 is connected to drive the slider arm 47 of feedback potentiometer 31 through a variable ratio drive, shown generally at 48. Variable drive 48 is indicated symbolically by a pair of rotating cone elements 49 coupled by an idler 50 which is manually shiftable by means of an "acceleration limit" setting knob 51. Variable drive 48 may be of any suitable type which, either alone or together with additional gear sets, will provide a substantial step-down ratio from the shaft speed of servo motor 43 to the slider arm 47. In the embodiment shown, the step-down ratio is on the order of 9000/1 and is adjustable to give a variation over a range from 1% of rated turbine speed per minute to 20% of rated turbine speed per minute. The exact step-down ratio, of course, is dependent upon the length of potentiometer travel available and upon the speed of the motor.

Also ganged to move with slider arm 47 is a slider arm 52 operating on a reference voltage potentiometer 53. The reference potentiometer 53 is also connected to the positive lead 29 of the D.C. voltage source by lead 54. This parallel arrangement of potentiometers 31, 53 is to isolate the acceleration control circuit 26 from the rest of the system so that the loading effects of one circuit will not be imposed upon the other. The voltage at slider arm 52 is imposed on resistor 62 to cause a controlled reference current to flow in line 63.

The slider arm 47 is connected by means of a feedback lead 55 through the control windings 39, 40 to the slider arm 34 to form a voltage bridge. Unbalance of the voltage between slider arms 34, 47 will thus cause a current to flow in one direction or the other through the control windings.

Alternate control over the motor 43 is provided by means of the double-throw switch 41 in its righthand position. Movement of switch 41 to the right serves to connect the servomotor control winding 42 to the secondary winding of a center-tapped transformer 56. The primary of transformer 56 is connected by means of leads 57 to A.C. source 27. The center terminal 58 of the secondary of transformer 56 is connected to a speed adjusting switch 59, by means of a lead passing through the control windings 42. By moving switch 59 either to the terminal 60 or to the terminal 61, servomotor control winding 42 is connected into either half of the secondary of transformer 56.

The operation of the acceleration control circuit shown in FIG. 2a may be summarized briefly as follows. Whenever the final speed setting knob 35 is changed, the slider arm 52 on potentiometer 53 moves to change the reference current supplied to the turbine control system at a rate determined by the setting of the variable drive 48. No matter how abruptly the final speed setting knob 35 is moved, the rate of change of the reference signal is relatively slow due to the step-down ratio of variable drive 48, and thus provides a controlled acceleration or deceleration of the turbine. The manner in which the acceleration control circuit accomplishes this is as follows. At the outset, the voltages on arms 34, 47 with respect to ground are balanced and there is no current flowing through lead 55 and therefore no current flowing through control windings 39, 40 in saturable reactor 36. By manually moving the final speed setting knob 35 to a new position, the new position of slider arm 34 introduces a voltage unbalance between potentiometer arm 34 and feedback potentiometer arm 47 causing a current to flow through line 55 and through the control windings 39, 40 of saturable reactor 36. This causes the cores of the saturable reactor 36 to become saturated on alternate half-cycles, thus causing an alternating current to flow in field control coils 42 of motor 43, the phase and magnitude depending on the direction and extent of movement of the slider arm 34. The shaft of the motor 43 then turns to move slider arm 47 in a direction so as to reduce the error voltage, thereby reducing the current flowing in lead 55. Slider arm 52 is moved simultaneously with slider arm 47 to provide a new reference voltage, thereby changing the magnitude of the current flowing in lead 63.

The rate of change with respect to time at which the reference voltage changes is controlled by the idler 50 on the variable drive 48. This idler 50 is set by the acceleration limit knob 51 which thereby provides the ability to set the slope of the "ramp" and hence the rate of acceleration at which the reference voltage ascends. By manipulating the acceleration limit knob 51 during speed changes, a non-linear rate of acceleration can be provided. For example, when the turbine rotor is near a critical speed, the acceleration limit knob 51 can be turned to provide a more rapid acceleration through the critical zone.

At any time in the cycle, manual adjustment of the prime mover speed can be obtained by throwing switch 41 to the right-hand position. This provides manual control over the field control winding 42 of motor 43. Potentiometer slider arm 47 will simply remain where it is and the motor 43 can be "jogged" under manual control by moving arm 59 to contact points 60, 61 so as to jog the motor up or down. This is useful to provide a means to remotely synchronize the prime mover if it happens to be driving a generator which is to be synchronized with another generator.

It should be particularly noted that saturable reactor 36 is selected so that with fairly large changes of speed setting, its core will operate in saturation thereby supplying the full A.C. wave of the line voltage to A.C. motor 43. Therefore, when the core is saturated, motor 43 may be said to run at a constant speed so as to move the contact arms of the potentiometers 31, 53 at a rate determined by the setting of the acceleration limit knob 51. As the reference speed is approached, however, the core of magnetic amplifier 36 comes out of saturation and the motor turns at a speed proportional to the voltage applied to control windings 42. As a consequence, the motor decelerates as the contact arms of the potentiometers 31 and 53 approach final speed setting, thus aiding greatly in preventing the system from overshooting the final speed setting.

*Amplification System*

The detailed schematic drawing of the amplification system may be seen by reference to FIG. 2b which primarily represents the block 12 shown in the block diagram of FIG. 1. As mentioned previously, the reference current in lead 63 is increased or decreased at a preset rate, determined by adjustment to knob 51, toward a final desired value. This reference current is amplified and modified by the amplification system shown generally at 64. The amplification system 64 is comprised of four magnetic amplifiers 71–74 controlling firing circuits 81–84 respectively, which gate four silicon controlled rectifiers 85–88, rectifiers 85 and 86 which supply current to the primary winding 90a of current supply transformer 90, and rectifiers 87 and 88 of which supply current to primary winding 93a of the transformer 93. The characteristics of the amplification system are adjusted by means of bias leads 65, 66 connected to the positive terminal 29 of the D.C. voltage source and having rheostats 68, 69 respectively. The control lead 63a and bias leads 65, 66 form the inputs to four magnetic amplifiers designated generally as 71–74, having load windings 71a–74a respectively. The bias lead 65 is connected so that a current will flow through bias windings 71b–74b in series to produce flux in the cores of magnetic amplifiers 71–74 as indicated by the dots in the conventional manner. Similarly, bias lead 66 is connected so that a current flows through bias windings 71c–74c as shown. The control lead 63a is connected so that the current flows in series through control windings 71d–74d to produce flux in the cores in the sense indicated by the dots.

The load windings 71a–74a of the magnetic amplifiers are supplied with A.C. power by an isolation transformer shown generally as 75 having its primary 76 connected to A.C. voltage source 27 by leads 77. The top two magnetic amplifiers 71, 72 operate during alternate half-cycles of the line voltage in a valve closing circuit designated generally as 78, while the bottom two magnetic amplifiers 73, 74 operate similarly in a valve opening circuit 79.

Isolation transformer 75 supplies power for four firing circuits designated generally as 81–84. The components of firing circuit 81–84 are designated by letter subscripts in like manner, therefore only the components of circuit 81 will be described. Firing circuit 81 is supplied from the secondary winding 81a of isolation transformer 75, which is in series with the load winding 71a of magnetic amplifier 71 and a diode rectifier 81b, across a load resistor 81c. One terminal of the load resistor 81c is connected through a smoothing circuit formed by a resistor 81d, and a rectifier 81e, and a capacitor 81g to the gating electrode of a silicon controlled rectifier 85, and the other terminal of load resistor 81c is connected by means of a lead 81f to the emitter of the silicon controlled rectifier 85. The components of firing circuits 81–84 are indicated in like manner. Thus when current flows through load resistors 81c–84c, the voltage drop across the load resistors provides for firing potential for silicon controlled rectifiers 85–88 respectively.

Silicon controlled rectifiers are solid state devices having the ability to allow an "off-on" flow of current through them when a given bias is provided. Their action is similar to that of a thyratron and substitution of equivalent switching devices of course would not involve a departure from the inventive concept here.

Magnetic amplifiers 71, 72 are connected to fire silicon controlled rectifiers 85, 86 on alternate half-cycles of line voltage by means of firing circuits 81, 82, according to the manner of connection of the transformer secondaries 81a, 82a as shown. Similarly, magnetic amplifiers 73, 74 are connected to fire silicon controlled rectifiers 87, 88 on alternate half-cycles by means of firing circuits 83, 84 according to the manner of connection of the transformer secondaries 83a, 84a.

The silicon controlled rectifiers 85 and 86 are connected in parallel branch circuits designated generally as 89 which are connected in series with the primary 90a of a valve closing transformer 90 and line supply leads 91. Also connected to lines 91 is a similar parallel branch circuit 92 for the valve opening circuit 79. Parallel branch circuit 92 is connected in series with line supply leads 91 and the primary 93a of a valve opening transformer 93. Protective fuses 91a, 91b serve the closing and opening circuits respectively.

The parallel branch 89 is made up of two oppositely-poled, unidirectional conducting paths connecting terminals 94, 95 so that selected portions of alternate half-cycles of the alternating current supply can flow between terminals 94, 95 during the time intervals when silicon controlled rectifiers 85, 86 are conducting. In order to reduce transients across the silicon controlled rectifiers, a resistance 96 and capacitor 97 are connected in shunt across silicon controlled rectifier 85. Similarly, a resistance 98 and capacitance 99 are connected in shunt across silicon controlled rectifier 86.

The parallel branch 92 is connected in exactly the same manner as parallel branch 89 with resistances 100, 101 and capacitances 102, 103 and arranged so that selected wave portions of an alternating current can pass between terminals 104, 105 when the silicon controlled rectifiers are conducting.

By the manner of connection shown, it will be apparent that if silicon controlled rectifiers 85, 86 are fired during fixed intervals of alternate half-cycles, the parallel branch 89 will be conducting during the intervals in which the silicon controlled rectifiers are fired, thus allowing portions of alternate half-cycles of the line voltage from leads 91 to pass through the primary of transformer 90. The parallel branch 92 will pass portions of alternate half-cycles through transformer 93 in a similar manner. For reasons which will be explained, overlapping firing of both parallel branches 89, 92 i.e., firing of all four silicon controlled rectifiers during each cycle occurs when control currents are small. When control currents are large, only one set of silicon controlled rectifiers fire and overlapped firing, therefore, does not occur. In order to rectify and combine these half-wave portions, a bridge circuit designated generally as 106, is used.

Bridge circuit 106 consists of four arms each of which comprises a full-wave bridge rectifier designated as 107, 108, 109, 110, respectively. Bridge circuit 106 receives its input from the secondaries 90b, 90c of transformer 90 and from the secondaries 93b, 93c of transformer 93 which are connected across corresponding sets of opposite terminals of the full-wave rectifiers 107–110. The remaining sets of opposite terminals of the full-wave rectifier bridges are interconnected through a resistor 111 and the D.C. output leads 112, 113 connected across the armature of a D.C. motor 114.

Each full-wave bridge rectifier includes four diodes designated by subscripts a–d. The A.C. terminals of the bridge rectifiers 107–110 are connected to the secondaries 93b, 90b, 90c, 93c respectively of transformers 90, 93. It will be observed that transformer 90 is connected to bridge rectifiers 108, 109 on opposite arms of bridge 106. Similarly, transformer 93 is connected to bridge rectifiers 107, 110 on the other opposite arms of bridge 106. By the manner of connection shown, valve closing transformer 90 produces a D.C. voltage of one polarity across output leads 112, 113 and the valve opening transformer 93 produces a D.C. voltage of opposite polarity across the output leads. Leads 112, 113 supply the input to D.C. motor 114.

If both transformers 90, 93 are pulsed simultaneously for the same length of time, the output voltages will balance and there will be no voltage across lines 112, 113.

It should be particularly noted, however, that if one of the transformers 90, 93 is pulsed slightly before the other, a voltage difference will appear across lines 112, 113, the polarity of which depends upon which transformer fires first and the magnitude of which depends upon the difference in the times that the two transformers are active.

The idealized transfer characteristic of the amplification system 64 may be seen by reference to FIG. 3 of the drawings. There, the reference input or control current $I_c$ supplied through input lead 63 is plotted as the abscissa and the output voltage $E_m$ supplied across leads 112 and 113 to the D.C. motor 114 is plotted as the ordinate. The portion of the curve designated "a" is the "transfer characteristic" obtained when a positive control current is flowing in line 63 and the valve opening circuit 79 is operating transformer 93 to actuate the full wave rectifier bridges 107, 110 to drive the motor in the valve opening direction. The portion of the curve designated "b" is the "transfer characteristic" obtained when a negative control current in line 63 is actuating valve closing circuit 78, transformer 90, bridges 108, 109 to drive the motor 114 in the valve-closing direction. The connecting portion "c" of the curve, which is obtained through the adjustment of the bias rheostat 69, as will be explained, is the combined characteristic obtained when all four magnetic amplifiers are "overlapping" or operating during each line cycle. The portion of the curve "c" to the right of the ordinate represents the times transformer 93 pulses before transformer 90 and to the left of the ordinate, the times when transformer 90 pulses first. It should be particularly noted that the slope of portion "c" is such as to provide a higher gain between the input $I_c$ and output $E_m$ when operating about the null point at small values of control current.

The operation of the amplification system 64 is as follows. The control windings 71d, 72d, 73d, 74d in magnetic amplifiers 71, 72, 73, 74 are arranged so that an increase in current in the control lead 63 moves magnetic amplifiers 73, 74, toward saturation and magnetic amplifiers 71, 72 away from saturation. Thus increase of the control current serves to increase the output of the lower pair of magnetic amplifiers and to decrease the output of the upper pair and vice versa.

The "dead-band" bias windings 71c–74c are arranged to move the cores of all four magnetic amplifiers 71–74 toward or away from saturation simultaneously by adjusting the "dead band" rheostat 69. It will be observed that the top pair of magnetic amplifiers operates independently from the lower pair. Therefore, the point at which the upper pair shut off due to the control current moving the cores out of saturation does not necessarily coincide with the point at which the lower pair begin conducting. Adjustment of this overlap, i.e. adjustment of the period during which all four amplifiers conduct, is effected by adjusting the "dead-band bias" 69. In actual operation, this is adjusted so that there is an overlapping period during which all four magnetic amplifiers are firing.

The other set of bias windings 71b–74b serve merely to shift the characteristic control curve for all four magnetic amplifiers shown in FIG. 3 to the right or left. This is used primarily for calibration purposes.

The load windings 71a–74a of the magnetic amplifiers are connected so that alternate half-cycles of voltage supplied by the isolation transformer 75 will be supplied by the secondaries 81a, 82a to the top pair of magnetic amplifiers and similarly by the secondaries 83a, 84a to the bottom pair of magnetic amplifiers. Thus taking the top pair for purposes of explanation, load windings 71a will conduct on the positive half-cycle, the current passing through rectifier 81b, and returning through load resistor 81c. Load windings 72a will be blocked by rectifier 82b.

On the negative half-cycle, however, current flow through load winding 71a will be blocked by the rectifier 81b while the control and bias windings 71b, 71c, 71d reset the flux level. Current flows through the load winding 72a of magnetic amplifier 72 and rectifier 82b and load resistor 82c.

Thus positive pulses appear on alternate half-cycles at the gating electrodes of silicon controlled rectifiers 85, 86. The duration of the positive pulses is set by the flux level in the magnetic amplifiers 71, 72, a greater magnitude of control current in control lead 63a giving a longer duration of the positive pulses.

The positive pulses appearing at silicon controlled rectifiers 85, 86 allow the A.C. current furnished by power leads 27 to flow through these rectifiers for a controlled interval of time in the parallel branch 89 appearing as alternating positive and negative amplified pulses across the primary of transformer 90.

Similarly, the lower set of magnetic amplifiers and silicon controlled rectifiers furnish amplification of the reference control current in line 63 when it is negative to provide amplified positive and negative pulses of line current at transformer 93. By adjusting the dead band bias 69, so as to move all four cores of magnetic amplifiers 71–74 closer toward or away from saturation, the upper set of silicon controlled rectifiers 85, 86 can be made to fire slightly before, at the same time as, or slightly later than the lower set of silicon controlled rectifiers 87, 88 in response to variation in the control current. On the positive half-cycle of the line voltage, for example, the positive pulse appearing across the primary transformer 90 can be made slightly longer than or slightly shorter than the coinciding positive pulse on the primary of transformer 93. In other words, with the dead band bias adjusted for the range b in the curve of FIG. 3, as the control current becomes more positive, with only the upper pair of magnetic amplifiers 71, 72 firing, they fire for shorter and shorter intervals of time. Before the silicon controlled rectifiers of branch 89 become nonconductive over the full cycle so that the positive and negative portions of the line voltage disappear completely at transformer 90, however, the silicon controlled rectifiers of branch 92 become conducting and line voltage begins to appear at transformer 93. As the control current continues to increase, the pulses at transformer 93 become of longer duration and the pulses at transformer 90 of shorter duration until they disappear completely. The foregoing operation applies only at small values of control current, i.e., near the zero input value, when the dead band bias 69 is adjusted to give overlapping firing of the magnetic amplifiers.

Of course, at large values of control current, either positive or negative, only one of the branches 89, 92 is admitting line current pulses to its respective transformer 90, 93. The other of the branches is inactive since its silicon controlled rectifiers are not being gated by the pair of magnetic amplifiers controlling it, these operating in an unsaturated state over the complete cycle.

The voltages appearing at secondaries 90b, 90c, 93b, 93c of transformers 90, 93 are summed in the bridge circuit 106 and applied to the D.C. motor 114. It will be observed that when transformer 90 is operating alone, its output is rectified by bridges 108, 109 to give a full wave output of one polarity across leads 112, 113 in series with resistance 111. Similarly, when transformer 93 is operating alone, its output is rectified by bridges 107, 110 and applied to give a voltage of opposite polarity to leads 112, 113. The D.C. motor 114 has a maximum speed proportional to the impressed voltage, therefore it will turn in either direction according to the polarity of the voltage at leads 112, 113 through the lead screw 135.

The circuitry shown in the amplifier provides a non-linear characteristic as shown in FIG. 3 which is adjustable according to the dead band bias rheostat 69. It will be observed that around the null point at small values of control current designated by the portion "c" of the characteristic curve, the rate of change of voltage $E_m$ supplied to motor 114 is much greater with a given change of control current $I_c$ than it is on portions "a" and "b" of the curve. This is due to the fact that at small values of control current, both the transformer 90 and the transformer 93 are furnishing positive and negative pulses to bridge 106. Portions of these voltages are cancelled out, so that the difference between the valve opening and the valve closing pulses, rather than the absolute value of either valve opening or valve closing pulses, appears across lines 112, 113; the polarity of the output depends upon which transformer fires first.

Therefore, since the rectified output is the difference between two changing values rather than the absolute values themselves, the gain of the amplifier is higher near the null point than it is at greater values of control current. This is seen in FIG. 3. The amount of overlap can be adjusted with the dead band bias 69 to give a desired operating characteristic.

*Prime Mover Control*

The remainder of the control system including portions of the feedback circuitry may be seen by reference to FIG. 2c of the drawing. The portion of the system controlling motive fluid to the prime mover may be described briefly as follows. High pressure, high temperature motive fluid, such as steam is generated in coils 120, passes through a "stop" valve 121, through a group of parallel-connected sequentially-operated "control" valves 122a, 122b to a steam turbine 16 driving a load 17 such as a generator. Valves 122a, 122b are opened in a predetermined sequence by an operator mechanism shown symbolically at 123 as a simple lift bar. Operator 123, however, could be a cam actuator, or any other suitable device. A hydraulic power amplifying relay 124 provides the power to operate the control valve operator 123 when furnished with a mechanical input signal through a rod 125. Input rod 125 is positioned by a lever 126 which, in turn, is positioned by mechanical flyball governor 127, operating through a resilient breakdown link 128. Link 128 is normally a "solid" connection due to the spring 128a, but will "break down" to allow the input rod 125 to be depressed, by means of a load limit 129, against the dictates of governor 127. A synchronizing screw 130 permits the adjustment of the speed setting which is then maintained by governor 125 operating control valves 122a, 122b. Of course, in parallel operation, where the speed is relatively constant due to the interconnected prime movers, the synchronizing screw 130 controls load on the prime mover rather than speed.

The aforementioned elements 120-130 are conventional and provide for speed or load control in "normal operation" at rated speed. However, during the wide ranges of speed encountered during startup, or during partial loading at rated speed, the electric governor controls the admission of steam to the turbine 16 by positioning a bypass valve 121a in stop valve 121, while all control valves 122a, 122b are held open for "full arc admission." Bypass valve 121a can be a separate valve but as shown here employs a small valve bypass disk 121b controlling the flow through the main stop valve disk 121c, which is hollow so as to permit the steam to flow through ports 121d and opening 121e.

The stop valve 121 is actuated through valve stem 121g by a hydraulic cylinder 131 controlled by a pilot valve 132 fed by a source of hydraulic fluid under pressure (not shown). A "floating" lever 133 transfers the movement of a threaded collar 134 on a lead screw 135 to the pilot valve input rod 132a. Pilot valve 132 is restored to its neutral position with floating lever 133 by means of a collar 121f on the bypass valve stem, as will be obvious from the drawing.

The lead screw 135 is driven by the D.C. motor 114 to move collar 134 upward or downward. Lead screw 135 may also be driven by a manual hand wheel 136 which will overcome motor 114 by means of the spring-loaded clutch mechanism 137 symbolically illustrated. Thus when a voltage is imposed upon motor 114, it will drive the collar 134 upward or downward according to the polarity of the amplifier output voltage furnished by leads 112, 113 to position pilot valve 132, which is then returned to its "neutral" position by the restoring lever 133 as the bypass valve 121a takes a new position.

The operation of the prime mover control is as follows. The leads 112, 113, across which appears the output voltage $E_m$ from amplifier 64, are connected to motor 114 so as to cause lead screw 135 to move collar 134 downward when the control current becomes more positive. Movement of the left-hand end of floating lever 113 downward causes oil to flow through pilot valve 132 so as to raise the piston in cylinder 131, thereby restoring pilot valve rod 132a to its neutral position.

Although the electric control system shown could also be used to position a fuel control valve in a gas turbine or the throttle of a diesel motor or any prime mover, it is shown here as positioning the bypass valve 121a in a steam turbine stop valve while the control valves 122a, 122b, etc., are wide open for "full arc admission." (The control valves 122a, 122b have been previously allowed to open full by unscrewing load limit screw 129 as far as it will go.) Since the turbine is generally at standstill when operation is commenced, the arms of the flyball governor 127 are shown collapsed in the drawing and the operator 123 is fully withdrawn to its uppermost position. Hence the control valves provide no obstruction to the steam flow and the position of the bypass valve disk 121b in stop valve 121 is the sole means for controlling the steam flowing to turbine 16. The steam will enter all nozzles of turbine 16 for "full arc admission."

As the output of the amplifier 64 changes, D.C. motor 114 will control the position of the bypass valve disk 121b, thus the speed of the turbine. Once the turbine is at rated speed, load may be gradually applied and the bypass valve 121b may be said to control the load which is accepted by the turbine rather than its speed. Such an arrangement may be useful up to some partial load.

The purpose of the transfer characteristic of amplifier 64 as shown in FIG. 3 may now be explained. As explained previously, the amplifier provides a higher gain about the null point. The D.C. motor 114 requires a certain voltage impressed on its windings before it will begin to move. This is due to static friction in its rotor and in the lead screw. Thus when the control current varies from its null point in either direction, the higher gain of the amplifier serves to give a "kick" to the motor 114 to start it moving. Thus increased sensitivity is obtained during "steady state" governing. At control currents further removed from the null point, however, the gain is less. Hence the system is more stable during transient conditions encountered during a change in speed.

*Prime Mover Speed Feedback*

The design of the control system is such that the system should supply zero control current when the prime mover is at proper speed.

In order to cancel the reference current flowing through resistance 62 so as to provide a zero control current when the prime mover is at the proper speed, a bucking current is fed back to a summing point 140, this current being proportional to prime mover speed. This current is produced by a three-phase tachometer generator 141 supplying an A.C. current through leads 142 to a full-wave three-phase rectifier 143. The output of rectifier 143 appears across a negative lead 144 and a positive lead 145. Capacitors 146, 147 and an inductance 148 together form a filter both to remove ripple and to remove any "beat" frequencies resulting when tachometer generator 141 is operating at a harmonic of the line frequency. A fixed resistor 149 and a variable resistor 150 shunted across lines 144, 145 provide an adjustment for calibration of the proper indication of speed on meter 150a.

A phase lead filter 151 consisting of a resistor 152 and a capacitor 153 connected in parallel (see FIG. 2b) serves to improve the transient response by compensating for the time lags in the rest of the system. These time lags all introduce phase lag into the system and the use of the phase lead filter 151 compensates for this. The current flows through a resistor 154 by way of line 155 back to summing point 140 where it is combined in "bucking" relation with the current supplied from lead 63 to approximately cancel out current flowing through the lead 63 when the proper speed is reached. Thus normally the resultant current appearing in control lead 63a under steady state governing will vary on either side of the null point depending on whether the actual speed of the prime mover is above or below the speed set by reference potentiometer 53 and the amount of current supplied by the valve position feedback path 160a. A decrease in speed causes a positive-going (or less negative) current to be supplied to summing point 140. The resulting error signal opens the valve wider so that the turbine will come back to speed.

*Valve Position Feedback*

In order to further stabilize the system, and to introduce a speed "droop" or "regulation" necessary for governing under load in parallel with other units, a valve position feedback is employed. This may be seen by a review of FIG. 1 where the valve position feedback is introduced at summing point 25. In a practical application, however, the valve position feedback conductor is connected to the same junction 140 in FIG. 2b as is the speed feedback conductor. Junction 140 represents both of the summing devices 11, 25 of FIG. 1. Movement of the bypass valve 121a in an opening direction causes a negative-going current to be fed back to the summing point 140. In order to accomplish this, a differential transformer shown generally as 156 (see FIG. 2c) includes a movable core 156a which is positioned by a link 157 arranged to be actuated by the collar 121f on the bypass valve 121a. The differential transformer primary 156b is supplied with an A.C. voltage of constant frequency and magnitude by an A.C. voltage regulator 158 connected to the main A.C. leads 27. A suitable voltage regulator for this use would be any of the constant-voltage transformers described on page 456, section 12, 13 of Components Handbook by John F. Blackburn, first edition, McGraw-Hill, New York, 1949. The secondary coils 156c, 156d are series connected in opposition so as to produce a sinusoidal current whose magnitude depends upon the extent core 156a is moved from the neutral position. Also, the current will be in or out of phase with that appearing across the primary 156b depending on whether the movement of core 156a is upward or downward. The output from differential transformer 156 is fed to a demodulator-rectifier 159 which may be of any suitable type. The demodulator-rectifier shown here utilizes two full-wave rectifier bridges 159a, 159b, each having one pair of opposite terminals supplied with A.C. power from voltage source 158 through leads 160 and having the remaining pair of opposite terminals connected in series with the two secondary coils 159c, 159d. The primary coils 159e, 159f are connected in parallel to the output of differential transformer 156. Thus the demodulator-rectifier 159 provides a D.C. voltage in line 160a, the polarity of which depends upon whether core 156a is above or below its neutral position, and the magnitude of which depends upon the extent of movement. A rheostat 161 adjusts the current flowing back to summing point 140 thus serving to adjust the speed droop or regulation of the electric governor. Because of the nature of the differential transformer and demodulator 159, the closed position of the stop valve 121b necessitates that a steady state current of positive polarity be supplied to the summing point 140 through conductor 160a. This allows the zero output current point for the differential transformer 156 and rectifier bridge 159 combination to be located at some intermediate point in the stop valve travel between the fully closed and fully opened condition, and makes this combination quite sensitive to valve movement. In order to compensate for this steady state current in the valve closed condition, the differential transformer bias potentiometer 69 (see FIG. 2b) is provided, which is connected to the additional bias windings 71b, 72b, 73b and 74b. The bias current supplied to the bias windings 71b, etc., then compensates or calibrates the system for the steady state current from the differential transformer 156 and demodulator 159 combination in the saturable reactors 71, 72, 73 and 74.

The valve position feedback is used to increase the stability of the system and to introduce "regulation" or "droop" into the operation of the governor. Suppose at first that the prime mover is operating independently at a set speed and that load can be supplied at will. Suppose further that there is no provision for valve position feedback. An increase in load will cause the speed to drop momentarily; this results in a positive-going signal from the tachometer generator which causes the valve to open wider so that the turbine will resume its exact previous set speed. This would be isochronous governing.

Let us now add the valve position feedback. The reference input potential is balanced by two negative potentials, one from the speed feedback, one from the valve position feedback. Addition of load causes the speed to drop. This results in a positive-going signal from the tachometer generator, as before, causing the valve to open wider. As the valve opens wider, it generates a negative-going signal due to the valve position feedback. Instead of the turbine coming back to the original speed it will now come back to a slightly lower speed. This is known as speed "droop."

In the foregoing example the reference voltage was held constant and the speed was changed due to the added load. Now suppose that the prime mover is interconnected with other prime movers, either mechanically or electrically, so that its speed is, for all practical purposes, fixed. Therefore, there can be no change in the speed feedback signal as load is applied. Without some provision for "droop" in the governing system, i.e. without the valve position feedback, our prime mover would accept load out of proportion to its share as total line load changed rather than only a determinable share of the total load. Once the prime mover has a tendency to "droop" in speed as load is added, however, it will not tend to accept the total increment of additional line load but will only accept its "fair share" of the line load. Load can be gradually applied to the system-connected prime mover by increasing the reference current. This reference current increase will be balanced by the increasingly negative valve position feedback as the valve is opened. By using the "full arc" admission scheme illustrated, the load can be applied up to some fraction of rated load.

*Modified Acceleration Control Circuit*

FIG. 4 of the drawings illustrates a modified form of the acceleration control portion of FIG. 2a designated by reference numeral 26. The portions of the system to the right-hand side of summing point 140 have been omitted for purpose of clarity. With this modification, instead of using a motor driving a potentiometer at an adjustable rate, the reference current is caused to increase at a controlled rate as before by means of an operational amplifier 170. Operational amplifier 170 may be a D.C. amplifier having a very high gain and, by use of the negative feedback capacitor 171, the device functions as an integrator, furnishing an output voltage which varies as the product of the input voltage and the time over which the input voltage acts. A suitable operational amplifier for this use would be any solid state or vacuum tube operational amplifier similar to the type shown in chapter 5 of Electronic Analog Computers by G. A. Korn and T. M. Korn, McGraw-Hill, New York, 1952. The input to amplifier 170 is supplied from a D.C. voltage source 172 through a variable resistor 173 and resistor 174 to the input lead 175 of the amplifier. Since an operational amplifier of this type produces a polarity inversion, the D.C. source is shown as negative in order to produce a positive output reference current to summing point 140. The voltage appearing at the output of amplifier 170 is fed back through a line 176 to feedback capacitor 171 and thence to the input side of the amplifier through line 177. The time-increasing output voltage from the amplifier causes current to flow through resistor 62 to summing point 140, the latter two reference numbers being analogous to those shown in FIG. 2b.

The input voltage supplied is proportional to the position of the slider arm on variable resistor 173, hence it will be seen that, since the rate of change of the output is proportional to the position of the slider arm, the slider arm setting is analogous to the acceleration limit setting knob 51 in FIG. 2a.

Cutoff of the input voltage and prevention of "drift" is accomplished by a limiting circuit comprising a variable resistor 178 connected on one side to a D.C. source 179 and on the other end to the output of amplifier 170. The slider arm of resistor 178 is connected through a diode 180 to the input side of amplifier 170. Thus when the output voltage rises to a value determined by the setting on variable resistors 178, current will flow through diode 180 to cut off the input. Thus the setting on the slider arm of resistor 178 is analogous to the final speed setting knob 35 in FIG. 2a.

The modified acceleration control circuit using the operational amplifier shown in FIG. 4 can be used to supply a reference voltage to summing point 140 which increases at a determinable rate. The rate is determinable by the setting on the input potentiometer 173. Thus the modification of FIG. 4 furnishes an increasing reference voltage to cause a current to flow through resistor 62 to summing point 140 in the same manner as the acceleration limiting system 26 shown in FIG. 2a. The inability of the system of FIG. 4 to provide a decelerating rate is of little practical significance, since the inertia of the prime mover will furnish a safe deceleration rate automatically. Its ability to reset to zero when the current is shut off is a safety feature which reduces the possibility of sudden uncontrolled acceleration which is possible with the mechanical arrangement due to improper operation by the operator.

*Advantages*

The electrical control system described provides a number of operating advantages not found in other control systems.

First of all, this is a long-range governor which will provide speed governing within close limits from speeds near standstill through normal operating speed. The embodiment shown is capable of holding speed within ±.15% over a range from 5% to 112% of rated speed.

Secondly, the acceleration control system provides acceleration at controlled rates to a predetermined final speed setting. The system shown gives a continuously adjustable rate of speed change from 1% of rated speed per minute to 20% of rated speed per minute. This is particularly useful with the type of steam turbine powerplant illustrated, where the acceleration of the unit can take place gradually with full arc admission to prevent excessive thermal gradients in the turbine casing, the steam admission being accomplished through a valve bypassing the stop valve while the sequentially operated control valves are full open. Controlled acceleration rates are useful for many other reasons, one of them being the elimination of temporary deceleration which may result in vibration of the turbine.

Thirdly, the use of the saturable reactor in the acceleration control system to drive an A.C. motor with the reactor in saturation during most of the reference voltage change, where the core comes out of saturation as the reference voltage is approached is useful to reduce overshooting the set speed of the prime mover.

Fourth, the alternate control provision using switch 41 allows remote speed adjustment. At any time, the reference voltage drive motor 43 can be disconnected by operating switch 41 and the prime mover speed will stay where it is. Switch 59 then provides means to manually jog the speed up or down as would be required in synchronizing a generator.

Fifth, the two-stage amplification system shown provides several other features. The control current is amplified many times by means of the magnetic amplifiers and the silicon controlled rectifier circuit to operate the lead screw motor 114. By adjusting the "dead band bias," so that all four amplifiers are firing during part of the cycle, a higher amplifier gain can be obtained around the null point according to the graph of FIG. 3. This acts to provide added impetus to move the D.C. motor 114 when it is at a standstill. Similarly, the "dead band bias" may be adjusted in the opposite direction to move all four magnetic amplifiers away from saturation, so that neither transformer 90 nor transformer 93 is firing near the null point. This can be used in systems where it is desired to actually introduce an amplifier "dead band," so that change in the control current produces little or no change in the output voltage, therefore providing increased load stability while running in parallel with a large system.

The use of both a speed feedback and a valve position feedback provides derivative type compensation. The lead filter circuit in the speed feedback line compensates for lags and improves the speed of response. The valve position feedback allows proper regulation when the prime mover is interconnected with a large system. Also the degree of "regulation" can be adjusted with a simple potentiometer setting. The use of a differential transformer rather than a potentiometer to provide the valve position feedback current is advantageous since there are no moving parts to wear out as with the slider arm of a potentiometer.

While there has been described what is at present considered to be the preferred embodiment of the invention, it will be understood that various modifications may be made therein, and it is intended to cover in the appended claims all such modifications which fall within the scope of the invention.

What we claim as new and desire to secure by Letters Patent of the United States is:

1. In a control system for a prime mover of the type having valve means for controlling the admission of motive fluid to the prime mover to thereby control its speed of operation, the combination including electrically driven motor means operatively coupled to said valve means for moving the same, and an acceleration control circuit electrically coupled to said motor means for controlling its operation, said acceleration control circuit comprising a first variable source of electric potential for supplying a first electric potential representative of a desired final speed, and means controlled by said first electric potential for developing a varying reference electric potential that varies at a preset rate, said varying reference electric potential being used to control said motor means.

2. In a control system for a prime mover of the type having valve means for controlling the admission of motive fluid to the prime mover to thereby control its speed of operation, the combination including electrically driven motor means operatively coupled to said valve means for moving the same, and an acceleration control circuit electrically coupled to said motor means for controlling its operation, said acceleration control circuit comprising a first variable source of electric potential for supplying a first electric potential representative of a desired final speed, saturable reactor means having control windings, a reversible motor controlled by the output of said saturable reactor, a reference potentiometer actuated by said motor means for developing a varying reference electric potential, said first electric potential and said reference electric potential being connected in bucking relation through the control windings of said saturable reactor, whereby a difference in potential causes the saturable reactor to operate said reversible motor to drive said reference potentiometer in a direction to cause the reference electric potential to balance said first electric potential, and variable ratio drive means connected between the motor means and the reference potentiometer including means to adjust the variable ratio drive means, whereby the rate at which the reference potential varies may be preset.

3. The combination according to claim 2 including means for selectively connecting a power source to said reversible motor for manually controlling the reference potential developed by said reference potentiometer, whereby the prime mover speed may be manually controlled.

4. In a control system for a prime mover of the type having valve means for controlling the admission of motive fluid to the prime mover to thereby control its speed of operation, the combination including electrically driven motor means operatively coupled to said valve means for moving the same, and an acceleration control circuit electrically coupled to said motor means for controlling its operation, said acceleration control circuit comprising a D.C. amplifier having its output connected to supply a varying reference potential to said motor means, means for supplying an adjustable source of input electrical potential to the input of said amplifier, a feedback capacitor connected between the output and input of said amplifier, whereby the output reference potential developed by said amplifier varies at a preset rate as determined by the setting on said last-named means, and means for supplying a unidirectional electric potential representative of a desired final speed of the prime mover between the input and output of said amplifier, whereby the amplifier output is limited to a predetermined value.

5. In a control system for a prime mover of the type having valve means for controlling the admission of motive fluid to the prime mover to thereby control its speed of operation, the combination including electrically driven motor means operatively coupled to said valve means for moving the same, an acceleration control circuit for developing a varying reference electric potential that varies at a preset rate, and an amplifier circuit coupled intermediate said acceleration control circuit and said motor means for operating the motor means in accordance with said varying reference potential, said amplifier circuit including circuit means for adjusting the gain of the amplifier in the vicinity of its zero input value.

6. In a control system for a prime mover of the type having valve mens for controlling the admission of motive fluid to the prime mover to thereby control its speed of operation, the combination including electrically driven motor means operatively coupled to said valve means for moving the same, an acceleration control circuit for developing a varying reference electric potential that varies at a preset rate, and an amplifier circuit coupled intermediate said acceleration control circuit and said motor means for operating the motor means in accordance with said varying reference potential, said amplifier circuit including first magnetic amplifier means connected together with first gating means to supply a first output potential for an interval of time determined by the magnitude of said amplifier input above the zero input value, second magnetic amplifier means connected together with second gating means to supply a second output potential for an interval of time determined by the magnitude of said amplifier input below the zero input value, bridge means connecting said first and second magnetic amplifier outputs in bucking relation including circuit means for applying the resultant of said first and second magnetic amplifier outputs to said motor means, and dead band bias control windings connected to move the cores of said first and second magnetic amplifiers toward or away from saturation simultaneously, whereby the degree of overlap of the first and second magnetic amplifier outputs may be adjusted near the zero amplifier input value so that the gain of the amplifier is greater in the vicinity of its zero input value.

7. In a control system for a prime mover of the type having valve means for controlling the admission of motive fluid to the prime mover to thereby control its speed of operation, the combination including electrically driven motor means operatively coupled to said valve means for moving the same, an acceleration control circuit for controlling the operation of said motor means, said acceleration control circuit comprising a first variable source of electric potential for supplying a first electric potential representative of a desired final speed, and means controlled by said first electric potential for developing a varying reference electric potential that varies at a preset rate, and an amplifier circuit for coupling said acceleration control circuit to said motor means, said amplifier circuit including circuit means for adjusting the gain of the amplifier in the vicinity of its zero input value.

8. In a control system for a prime mover of the type having valve means for controlling the admission of motive fluid to the prime mover to thereby control its speed of operation, the combination including electrically driven motor means operatively coupled to said valve means for moving the same, an acceleration control circuit for controlling the operation of said motor means, said acceleration control circuit comprising a first variable source of electric potential for supplying a first electric potential representative of a desired final speed, and means controlled by said first electric potential for developing a varying reference electric potential that varies at a preset rate, and an amplifier circuit for coupling said acceleration control circuit to said electric motor means, said amplifier circuit including first magnetic amplifier means connected together with first gating means to supply a first output potential for an interval of time determined by the magnitude of said amplifier input above the zero input value, second magnetic amplifier means connected together with second gating means to supply a second output potential for an interval of time determined by the magnitude of said amplifier input below the zero input value, bridge means connecting said first and second magnetic amplifier output in bucking relation including circuit means for applying the resultant of said first and second magnetic amplifier outputs to said motor means, and dead band bias control windings connected to move the cores of said first and second magnetic amplifiers toward or away from saturation simultaneously, whereby the degree of overlap of the first and second magnetic amplifier outputs may be adjusted near the zero amplifier input value so that the gain of the amplifier is greater in the vicinity of its zero input value.

9. In a control system for a prime mover of the type having valve means for controlling the admission of motive fluid to the prime mover to thereby control its speed of operation, the combination including electrically driven motor means operatively coupled to said valve means for moving the same, an acceleration control circuit electrically coupled to said motor means for controlling its operation, said acceleration control circuit comprising a first variable source of electric potential for supplying a first electric potential representative of a desired final speed, saturable reactor means having control windings, a reversible motor controlled by the output of said saturable reactor, a reference potentiometer actuated by said reversible motor for developing a varying reference electric potential, said first electric potential and said reference electric potential being connected in bucking relation through the control windings of said saturable reactor, whereby a difference in potential causes the saturable reactor to operate said reversible motor to drive said reference potentiometer in a direction to cause the reference potential to balance the first electric potential, and variable ratio drive means connected between the reversible motor and the reference potentiometer including means to adjust the variable ratio drive means, whereby the rate at which the reference potential varies may be preset, and an amplifier circuit coupled intermediate said acceleration control circuit and said motor means for operating the motor means in accordance with the varying reference potential, said amplifier circuit including circuit means for adjusting the gain of the amplifier in the vicinity of its zero input value.

10. The combination according to claim 9 including means for selectively connecting a power source to said reversible motor for manually controlling the reference potential developed by said reference potentiometer, whereby the prime mover speed may be manually controlled.

11. In a control system for a prime mover of the type having valve means for controlling the admission of motive fluid to the prime mover to thereby control its speed of operation, the combination including electrically driven motor means operatively coupled to said valve means for moving the same, an acceleration control circuit electrically coupled to said motor means for controlling its operation, said acceleration control circuit comprising a first D.C. amplifier having an output supplying a varying reference potential, means for supplying an adjustable source of input electrical potential to the input of said D.C. amplifier, a feedback capacitor connected between the output and input of said D.C. amplifier, whereby the output reference potential developed by the amplifier varies at a preset rate as determined by the setting on said last-named means, and means for supplying a unidirectional electric potential representative of a desired final speed of the prime mover between the input and output of said amplifier, whereby the D.C. amplifier output is limited to a predetermined value, and a second amplifier circuit having its input connected to the output of said acceleration control circuit and having its output connected to said electric motor means for operating the motor means in accordance with the varying reference potential, said second amplifier circuit including circuit means for obtaining increased gain of the amplifier in the vicinity of its zero input value.

12. In a control system for a prime mover of the type having valve means for controlling the admission of motive fluid to the prime mover to thereby control its speed of operation, the combination including electrically driven motor means operatively coupled to said valve means for moving the same, an acceleration control circuit electrically coupled to said motor means for controlling its operation, said acceleration control circuit comprising a first variable source of electric potential for supplying a first electric potential representative of a desired final speed, saturable reactor means having control windings, a reversible motor controlled by the output of said saturable reactor, a reference potentiometer actuated by said reversible motor for developing a varying reference electric potential, said first electric potential and said reference electric potential being connected in bucking relation through the control windings of said saturable reactor, whereby a difference in potential causes the saturable reactor to operate said reversible motor to drive said reference potentiometer in a direction to cause the reference potential to balance the first electric potential, and variable ratio drive means connected between the motor means and the reference potentiometer including means to adjust the variable ratio drive means, whereby the rate at which the reference potential varies may be preset, and an amplifier circuit for coupling said acceleration control circuit to said electric motor means, said amplifier circuit including first magnetic amplifier means connected together with first gating means to supply a first output potential for an interval of time determined by the magnitude of said amplifier input above the zero input value, second magnetic amplifier means connected together with second gating means to supply a second output potential for an interval of time determined by the magnitude of said amplifier input below the zero input value, bridge means connecting said first and second magnetic amplifier outputs in bucking relation including circuit means for applying the resultant of said first and second magnetic amplifier outputs to said electric motor means, and dead band bias control windings connected to move the cores of said first and second magnetic amplifiers toward or away from saturation simultaneously, whereby the degree of overlap of the first and second magnetic amplifier outputs may be adjusted near the zero amplifier input value, whereby the gain of the amplifier is greater in the vicinity of its zero input value.

13. In a control system for a prime mover of the type having valve means for controlling the admission of motive fluid to the prime mover to thereby control its speed of operation, the combination including electrically driven motor means operatively coupled to said valve means for moving the same, an acceleration control circuit electrically coupled to said motor means for controlling its operation, said acceleration control circuit comprising a D.C. amplifier having its output connected to supply a varying reference potential to said motor means, means for supplying an adjustable source of input electrical potential to the input of said D.C. amplifier, a feedback capacitor connected between the output and input of the D.C. amplifier, whereby the output reference potential developed by said amplifier varies at a preset rate as determined by the setting on said last-named means, and means for supplying a unidirectional electric potential representative of a desired final speed of the prime mover between the input and output of said amplifier, whereby the amplifier output is limited to a predetermined value, and an amplifier circuit for coupling said acceleration control circuit to said electrically driven motor means, said amplifier circuit including first magnetic amplifier means connected together with first gating means to supply a first output potential for an interval of time determined by the magnitude of said amplifier input above the zero input value, second magnetic amplifier means connected together with second gating means to supply a second output potential for an interval of time determined by the magnitude of said amplifier input below the zero input value, bridge means connecting said first and second magnetic amplifier outputs in bucking relation including circuit means for applying the resultant of said first and second magnetic amplifier outputs to said electric motor means, and dead band bias control windings connected to move the cores of said first and second magnetic amplifiers toward or away from saturation simultaneously, whereby the degree of overlap of the first and second magnetic amplifier outputs may be adjusted near the zero amplifier input value so that the gain of the amplifier is greater in the vicinity of its zero input value.

14. In combination, a prime mover having valve means for controlling the admission of motive fluid to the prime mover to thereby control its speed of operation, electrically driven motor means operatively coupled to said valve means for moving the same, an acceleration control circuit electrically coupled to said motor means for supplying said motor means with a reference electric potential for controlling its operation, speed feedback means operatively coupled to said prime mover for deriving an electric speed signal indicative of the speed of said prime mover and for feeding back said speed signal to the input of said motor means in bucking relation with respect to the reference electric potential supplied from said acceleration control circuit, and valve position feedback means responsive to the position of said valve means and so constructed and arranged as to provide an electric valve position feedback signal which increases, as the valve means is opened, in a direction opposite in effect from that produced by the speed feedback means as the speed is reduced, whereby speed droop or load sharing capacity of the prime mover is achieved, said valve position feedback signal being operatively coupled back to the input of said electric motor means together with the speed signal and the electric potential from said acceleration control circuit.

15. In combination, a prime mover having valve means for controlling the admission of motive fluid to the prime mover to thereby control its speed of operation, electrically driven motor means operatively coupled to said valve means for moving the same, an acceleration control circuit electrically coupled to said motor means, said acceleration control circuit including a first variable source of electric potential for supplying a first electric potential representative of a desired final speed, and means controlled by said first electric potential for developing a varying reference electric potential that varies at a preset rate, speed feedback means operatively coupled to said prime mover for deriving an electric speed signal indicative of the speed of said prime mover and for feeding back said speed signal to the input of said motor means in bucking relation with respect to the reference electric potential supplied from said acceleration control circuit, and valve position feedback means responsive to the position of said valve means and so constructed and arranged as to provide an electric valve position feedback signal which increases, as the valve means is opened, in a direction opposite in effect from that produced by the speed feedback means as the speed is reduced, whereby speed droop or load sharing capacity of the prime mover is achieved, said valve position feedback signal being operatively coupled back to the input of said electric motor means together with the speed signal and the electric potential from said acceleration control circuit.

16. In combination, a prime mover having valve means for controlling the admission of motive fluid to the prime mover to thereby control its speed of operation, electrically driven motor means operatively coupled to said valve means for moving the same, an acceleration control circuit electrically coupled to said motor means for supplying said motor means with a reference potential for controlling its operation, an amplifier circuit coupled intermediate said acceleration control circuit and said motor means for operating the motor means in accordance with the varying reference potential, said amplifier circuit including circuit means for adjusting the gain of the amplifier in the vicinity of its zero input value, speed feedback means operatively coupled to said prime mover for deriving an electric speed signal indicative of the speed of said prime mover and for feeding back said speed signal to the input of said motor means in bucking relation with respect to the reference electric potential supplied from said acceleration control circuit, and valve position feedback means responsive to the position of said valve means and so constructed and arranged as to provide an electric valve position feedback signal which increases, as the valve means is opened, in a direction opposite in effect from that produced by the speed feedback means as the speed is reduced, whereby speed droop or load sharing capacity of the prime mover is achieved, said valve position feedback signal being operatively coupled back to the input of said motor means together with the speed signal and the electric potential from said acceleration control circuit.

17. In combination, a prime mover driving a load, valve means controlling the flow of motive fluid to said prime mover, an electrical control system for positioning said valve means to provide speed control over a large range of prime mover speeds and load control over a limited range of prime mover speeds comprising first means supplying a reference signal proportional to a desired speed of the prime mover, second means for selectively controlling the time rate of change of said reference signal, third means responsive to prime mover speed furnishing a speed feedback signal in bucking relation to said reference signal, fourth means responsive to valve position furnishing a valve position feedback signal which increases as the valve means is opened in a direction opposite in ecect from that produced by the speed feedback signal as the speed is reduced, amplifier means amplifying the resultant of the reference signal, the speed feedback signal, and the valve position feedback signal to furnish a combined amplified output signal, and motor means responsive to said amplified output signal positioning said valve means, whereby the prime mover may be gradually accelerated by controlling the reference signal and whereby once the prime mover is at the desired speed, the reference signal will be balanced by the speed responsive signal and the valve position signal to produce "regulation" under load.

18. In combination, a prime mover having valve means controlling the flow of motive fluid to said prime mover, an electrical control system for positioning said valve means comprising first means supplying a reference signal proportional to a desired speed of the prime mover, second means responsive to prime mover speed furnishing a speed feedback signal in bucking relation to said reference signal, third means responsive to valve position so constructed and arranged as to provide a valve position feedback signal which increases, as the valve means is opened, in a direction opposite in effect from that produced by the speed feedback signal as the speed is reduced, whereby the prime mover will exhibit "droop" under load, amplifier means amplifying the resultant of the reference signal, the speed feedback signal and the valve position feedback signal to furnish an amplified output signal, said amplifier means having increased gain in the vicinity of its zero input value, and motor means positioning said valve means in response to said amplified output signal, whereby the valve means will be operated with increased sensitivity during very small changes in speed or load.

19. In combination, a prime mover having valve means controlling the flow of motive fluid to said prime mover, an electrical control system for positioning said valve means comprising first means supplying a reference signal proportional to a desired speed of the prime mover, second means responsive to prime mover speed furnishing a speed feedback speed signal in bucking relation to said reference signal, summing means for combining said reference and said speed signals to provide a control signal proportional to the speed error, amplifier means for providing an output signal which is non-linear with respect to said control signal, the gain of said amplifier means being higher when the control signal has small values, and motor means positioning said valve in response to said control signal, whereby the non-linear amplification gives faster speed of response during small changes of the control signal.

20. An electrical control system for a prime mover with valve means controlling the supply of actuating medium to said prime mover comprising, a feedback regulator and control portion for developing a speed feedback signal in response to the speed of said prime mover, an acceleration control portion operative independently of said feedback regulation and control portion for independently developing an electrical reference potential signal of adjustable magnitude, means for combining said speed feedback signal in bucking relation to said reference potential signal to produce a resultant control signal at a summing point, amplifier means having an input connected to said summing point and energized by said resultant control signal to produce an amplified output voltage at the output of said amplifier, motor means connected to said output of said amplifier and energized by said amplified output voltage for positioning said valve means in response to said amplified output voltage to control the speed of said prime mover, said acceleration control portion including means independent of said feedback regulation and control portion to adjust the magnitude of said reference potential signal at a selected time rate of change whereby the prime mover may be accelerated at a desired rate.

References Cited in the file of this patent

UNITED STATES PATENTS

| | | |
|---|---|---|
| 2,824,422 | Peterson | Feb. 25, 1958 |
| 2,919,384 | Guarino et al. | Dec. 29, 1959 |